United States Patent [19]
Okawa

[11] Patent Number: 5,629,850
[45] Date of Patent: May 13, 1997

[54] VEHICLE SLIP DETECTION DEVICE

[75] Inventor: Yukio Okawa, Hiratsuka, Japan

[73] Assignee: Kabushiki Kaisha Komatsu Seisakusho, Tokyo, Japan

[21] Appl. No.: 397,111

[22] PCT Filed: Sep. 7, 1993

[86] PCT No.: PCT/JP93/01267

§ 371 Date: Mar. 8, 1995

§ 102(e) Date: Mar. 8, 1995

[87] PCT Pub. No.: WO94/05521

PCT Pub. Date: Mar. 17, 1994

[30] Foreign Application Priority Data

Sep. 8, 1992 [JP] Japan ................................. 4-239744

[51] Int. Cl.$^6$ ............................................ B60K 28/16
[52] U.S. Cl. .......................... 364/426.016; 364/426.027; 180/197
[58] Field of Search ........................ 364/426.01, 426.02, 364/426.03, 424.05; 180/197

[56] References Cited

U.S. PATENT DOCUMENTS

| | | | |
|---|---|---|---|
| 5,265,019 | 11/1993 | Harara et al. | 364/424.05 |
| 5,341,297 | 8/1994 | Zomotor et al. | 364/426.03 |

FOREIGN PATENT DOCUMENTS 61-70617  4/1986  Japan.

*Primary Examiner*—Gary Chin
*Attorney, Agent, or Firm*—Varndell Legal Group

[57] ABSTRACT

A device for automatically detecting vehicle slip. A theoretical turning velocity $\omega t$ is detected when wheels or crawlers of a vehicle 1 do not slip at all with respect to the road surface on which the vehicle travels based on outputs $v$ and $\phi$ of a vehicle speed sensor 5 and a steering angle sensor 4. A current turning angular velocity $\omega r$ of the vehicle 1 is then computed based on the output of a heading angle sensor 6. The slip of the vehicle 1 is then detected based on a difference between these two turning angular velocities $\omega t$ and $\omega r$. It is therefore possible to prevent course deviation and the like, and thus possible to dramatically improve vehicle safety.

4 Claims, 2 Drawing Sheets

VEHICLE SLIP DETECTION DEVICE

TECHNICAL FIELD

The present invention relates to a device for detecting a lateral slip of the front or rear wheels (hereafter referred to simply as slip) of a vehicle.

BACKGROUND ART

With dump trucks or other such vehicles, if an operator is on board and at the controls, it is possible to ensure that the vehicle does not deviate from its desired course through proper manipulation of the steering wheel, accelerator and brakes, for the operator feeling the slip of the vehicle when travelling through a curve.

However, there have been attempts in recent years at the unmanned operation of dump trucks, in which case [the vehicle] has gone off-course when it has slipped during travelling and no suitable countermeasure has been taken. Therefore, the realization of an unmanned system will require slip to be detected automatically and suitable countermeasures to be taken based on the detection results.

The present invention was devised in light of this situation, and its object is the automatic detection of vehicle slip.

DISCLOSURE OF THE INVENTION

In this invention, a vehicle is provided with a vehicle speed sensor for detecting a speed of the vehicle, a steering angle sensor for detecting a steering angle of the vehicle, and a heading angle sensor for detecting a heading angle of the vehicle, with which a theoretical turning angular velocity of the vehicle is computed based on outputs of the vehicle speed sensor and the steering angle sensor, a current turning angular velocity of the vehicle is computed based on an output of the heading angle sensor, and a slip of the vehicle is detected based on the difference between the turning angular velocities.

According to the structure of the invention, a theoretical turning velocity when the wheels or crawlers do not slip at all with respect to a road surface on which the vehicle travels is detected based on the outputs of the vehicle speed sensor and the steering angle sensor. The current turning angular velocity is computed based on the output of the heading angle sensor. Vehicle slip is thus detected based on the difference between these turning angular velocities.

BEST MODE FOR CARRYING OUT THE INVENTION

An embodiment of a vehicle slip detection device which pertains to the present invention is described below with reference to the figures.

Figure 1:
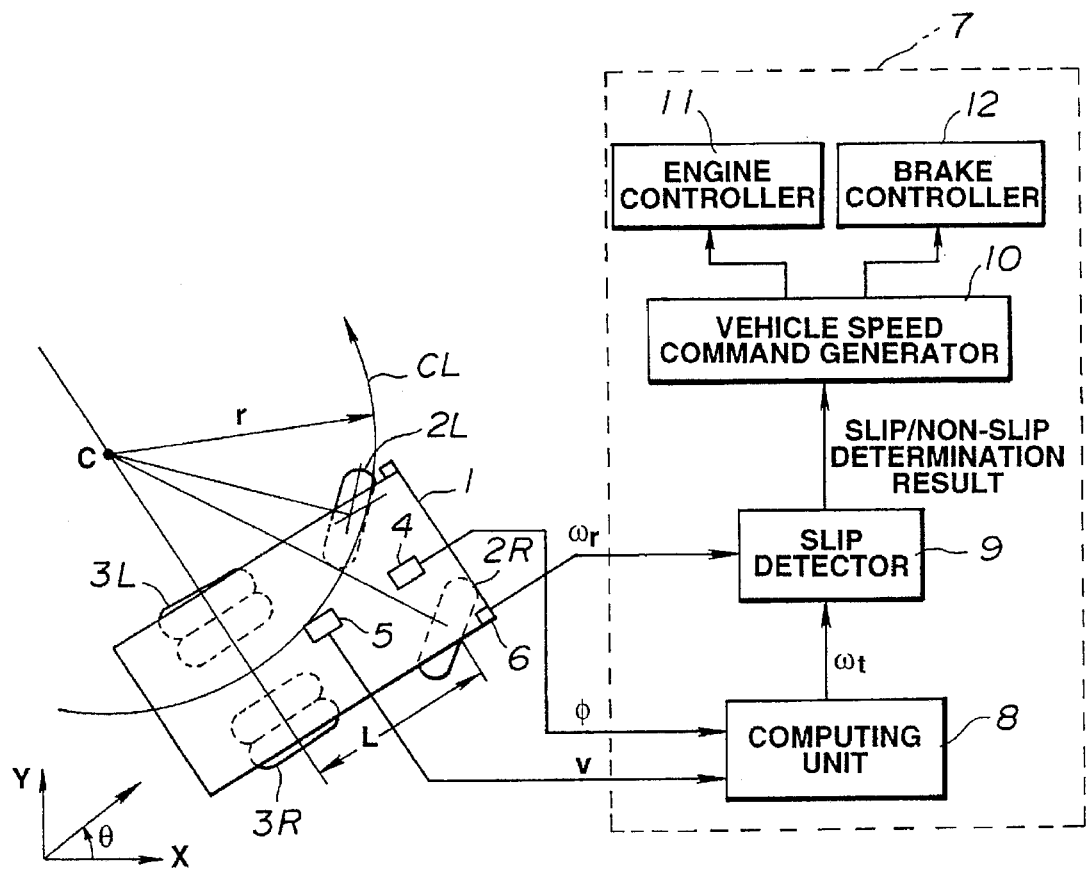
FIG. 1 is a block diagram which depicts the structure of an embodiment of a vehicle slip detection device which pertains to the present invention.

FIG. 1 is a block diagram depicting the structure of the device of the embodiment; a vehicle 1 is, for example, a dump truck, and has front wheels 2L (left) and 2R (right) and rear wheels 3L (left) and 3R (right). The steering angle $\phi$ of the front wheels 2L and 2R is changed by steering input. The vehicle 1 therefore travels over the locus CL having a turning center C and a turning radius r in accordance with the steering angle $\phi$. The vehicle 1 is an unmanned vehicle, and is steered automatically. The vehicle 1 is furnished with a steering angle sensor 4, a vehicle speed sensor 5, and a gyro 6.

The steering angle sensor 4 is provided at the lower side of the vehicle body in the vicinity of the front wheels 2L and 2R, and detects the steering angle $\phi$ of the vehicle 1. The vehicle speed sensor 5 detects the vehicle speed v by detecting the speed of rotation of the output shaft of the engine. The gyro 6 is a so-called rate gyro which detects the current turning angular velocity $\omega r$ of the vehicle 1 by ascertaining the change over time of the heading angle $\theta$ of the vehicle with respect to the X axis direction of the road surface on which the vehicle travels. This turning angular velocity $\omega r$ moreover includes a component in which the angular velocity is changed by the slip of the vehicle 1. The output $\phi$ of the steering angle sensor 4 and the output v of the vehicle speed sensor 5 are supplied to a computing unit 8 of a control device 7 mounted in the vehicle 1, and the output $\omega r$ of the gyro 6 is supplied to a slip detector 9 of the same control device 7.

In the computing unit 8, the theoretical turning angular velocity $\omega t$ is computed based on formula (1) below based on the supplied sensor outputs $\phi$ and v assuming that the vehicle 1 is not slipping.

$$\omega t = v \cdot \tan\phi / L \tag{1}$$

where L is the wheel base of the vehicle 1.

This computed result $\omega t$ is then supplied to the slip detector 9. The slip detector 9 computes the error evaluation amount e shown in formula (2) below based on the $\omega t$ supplied from the computing unit 8 and the current turning angular velocity $\omega r$ supplied from the gyro 6.

$$e = \int SQ(\omega r - \omega t') dt \tag{2}$$

where $SQ(\omega r - \omega t')$ indicates the square of $(\omega r - \omega t')$.

Here, the integral time is a predetermined time. Further, $\omega t'$ is the value obtained by correcting $\omega t$ by adding a time lag component, since there is a time lag from the steering change until the vehicle 1 actually changes direction. The corrected value $\omega t'$ is determined using a differential equation such as that given below, with $\tau$ being the time lag time constant.

$$\tau \cdot d\omega t'/dt + \omega t' = \omega t \tag{3}$$

The reason that the integral of the square of the turning angular velocity difference $\omega r - \omega t'$ is taken as the evaluation amount e in formula (2) is that there may be a case where an accurate evaluation is not possible when the difference $\omega r - \omega t'$ is used directly, because of the influence of noise or the like. The larger the evaluation amount e, the larger the current slip of the vehicle 1.

Whether the vehicle 1 is currently slipping or not is determined based on a determination of whether or not this evaluation amount e is at or above the threshold value e0.

As a result, when it has been determined that the vehicle 1 is slipping, a signal indicating this result is sent to the vehicle velocity command generator 10.

When the determination result has been given, the vehicle velocity command generator 10 issues, based on this, a deceleration command for decelerating the vehicle 1 to a specified velocity, and this is output to the engine controller 11 and the braking controller 12. Here, the specified speed is a predetermined speed at which the vehicle 1 does not readily go off-course even when it travels at this speed. The engine controller 11 controls the amount of fuel injected so that the target speed of the engine becomes the set speed when the deceleration command has not been given, and the brake controller 12 activates the brake in response to brake application when the deceleration command has not been given. When the deceleration command has been given, however, the engine controller 11 controls the amount of fuel injection so that the vehicle 1 is decelerated to the specified speed, and the brake controller 12 activates the brakes independently of the brake application so that the vehicle speed is reduced to the specified speed.

Figure 2:
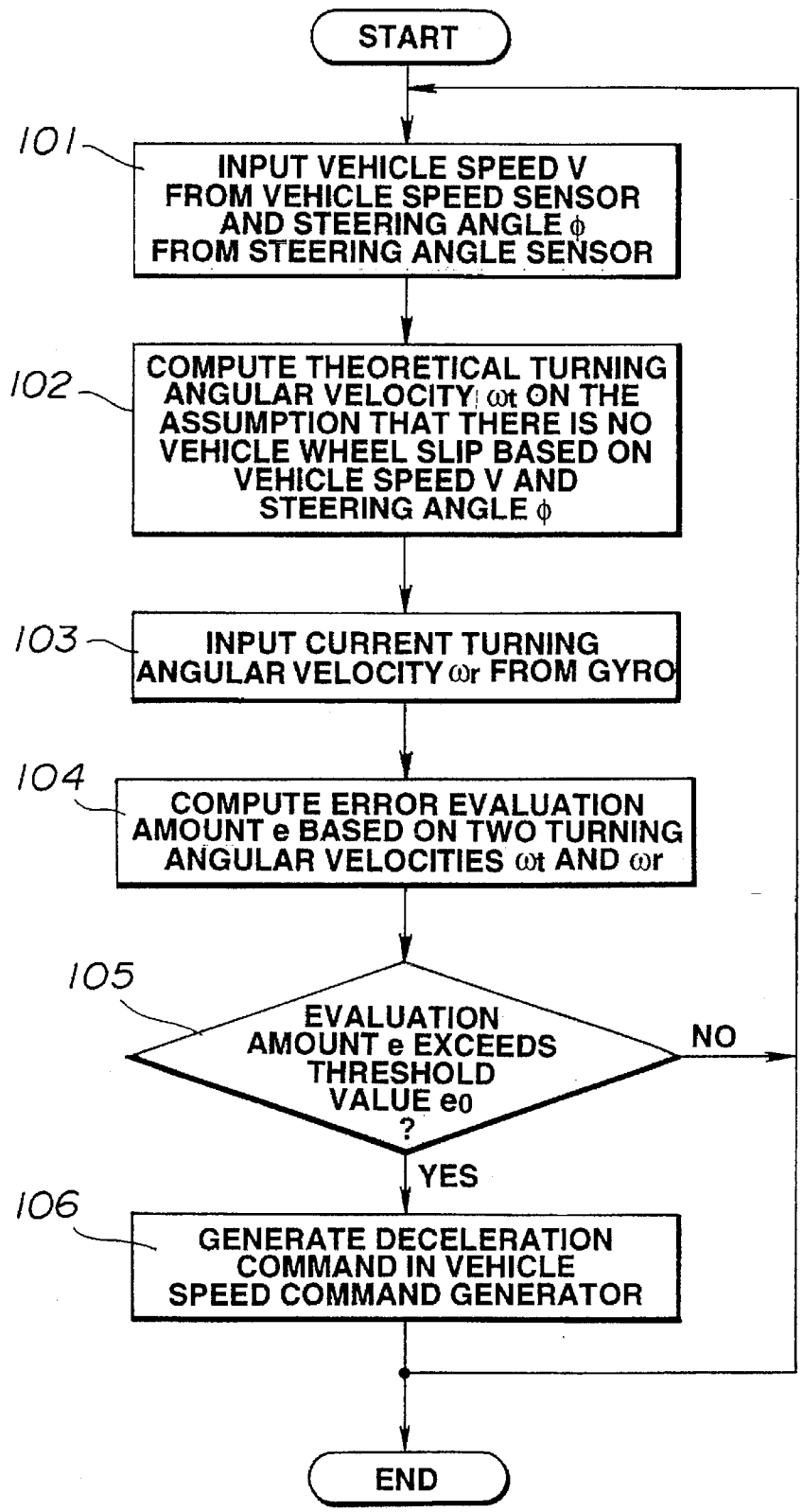
FIG. 2 is a flow chart which illustrates the order of the steps implemented by the control device shown in FIG. 1.

The brake control effected by the brake controller 12 is carried out only when the difference between the current speed of the vehicle 1 and the specified speed is at or above a specified value, and the duration of deceleration is thus shortened. FIG. 2 is a flow chart illustrating the order in which the steps are carried out by the control device 7. Specifically, during the travelling of the vehicle 1, the vehicle speed v is input from the vehicle speed sensor 5, and the steering angle φ is input from the steering angle sensor 4 (step 101). Next, the theoretical turning angular velocity ωt on the assumption that the wheels of the vehicle 1 are not slipping is computed based on the input vehicle speed v and steering angle φ using formula (1) above (step 102).

Next, the current turning angular velocity ωr is input from the gyro 6 (step 103). Next, the error evaluation amount e is computed from formula (2) above based on the turning angular velocities ωt and ωr obtained in steps 102 and 103, respectively (step 104). A determination is then made as to whether this evaluation amount e that has been computed in step 104 exceeds the threshold value e0 (step 105). When the evaluation amount e does not exceed the threshold value e0, not enough slip is generated to constitute a problem, and there is consequently no danger of course deviation at this vehicle speed, and the process shifts to step 101 again without decelerating the vehicle 1.

On the other hand, when the evaluation amount e exceeds the threshold value e0, it is determined that slip is generated and that there is a danger of course deviation at this speed; the next step 106 is then proceeded to for reducing vehicle speed for the sake of safety.

A determination result of "slip" is consequently output to the vehicle speed command generator 10, and a command for reducing the speed of the vehicle 1 is output to the engine controller 11 and the brake controller 12. As a result, the speed of the vehicle 1 is reduced to the specified speed, and the turn is safely accomplished without course deviation (step 106).

Although the speed of the vehicle 1 is reduced to a specified speed in the embodiment, it is also possible to vary the rate of deceleration depending on the error evaluation amount.

In the embodiment, moreover, although deceleration is effected when vehicle slip has been detected, the present invention is not limited to this, and if slip has been detected the vehicle may also be stopped for the sake of safety. In short, as long as a specific countermeasure against abnormal slippage is taken based on a detection result of "slip," the particulars of the process are optional.

In the embodiment, although the current turning angular velocity ωr of the vehicle 1 is directly detected by the rate gyro, it may also be determined through the differentiation of the gyro compass output. It is also possible to determine the turning angular velocity based on the output of a magnetic sensor. In short, any means may be applied as long as the actual turning angular velocity can be computed based on the output of a specified heading angle sensor.

Although the evaluation amount e is computed in the embodiment based on formula (2) above, so long as the presence or absence of slip can be accurately determined based on the difference between the turning angular velocities, the particulars of the computation are optional.

Although it is assumed in the embodiment that a dump truck having wheels serves as the vehicle, the present invention is not limited to this, and can also apply to crawler vehicles; any type of vehicle is acceptable. The present invention is not limited to front wheel-steering vehicles, and can also of course apply to rear wheel-steering vehicles.

Although an unmanned vehicle is considered in the embodiment, the present invention can apply to manned vehicles operated by a driver.

INDUSTRIAL APPLICABILITY

As described above, since the present invention allows the slip of a vehicle during travelling to be automatically detected, it is possible to take suitable steps based on this detection result to prevent problems such as course deviation. It is consequently possible to significantly improve the vehicle safety.

I claim:

1. A vehicle slip detection device comprising:

a vehicle speed sensor provided in a vehicle, for detecting a speed of the vehicle;

a steering angle sensor provided in the vehicle, for detecting a steering angle of the vehicle;

a heading angle sensor provided in the vehicle, for detecting a heading angle of the vehicle;

theoretical turning angular velocity computing means for computing a theoretical turning angular velocity of the vehicle based on outputs of the vehicle speed sensor and the steering angle sensor;

correcting means for correcting the theoretical turning angular velocity based on the theoretical turning angular velocity computed by the theoretical turning angular velocity computing means and on a lag time from operation of steering of the vehicle to a start of turning of the vehicle resulting from the operation;

current turning angular velocity computing means for computing a current turning angular velocity of the vehicle based on an output of the heading angle sensor; and detection means for detecting a slip of the vehicle based on a difference between the computed current turning angular velocity and the corrected theoretical turning angular velocity.

2. A vehicle slip detection device as defined in claim 1, further comprising control means for controlling the vehicle speed so as to effect deceleration of the vehicle when slippage of the vehicle has been detected.

3. A vehicle slip detection device as defined in claim 1, wherein the theoretical turning angular velocity computing means computes the theoretical turning angular velocity based on a wheel base of the vehicle, the steering angle output from the steering angle sensor, and the vehicle speed output from the vehicle speed sensor.

4. A vehicle slip detection device as defined in claim 1, wherein the detection means computes a mean square error of the difference between the theoretical turning angular velocity and the current turning angular velocity, and determines that the vehicle is slipping when the computed value is at or above a specified value.

* * * * *